Figure 1:
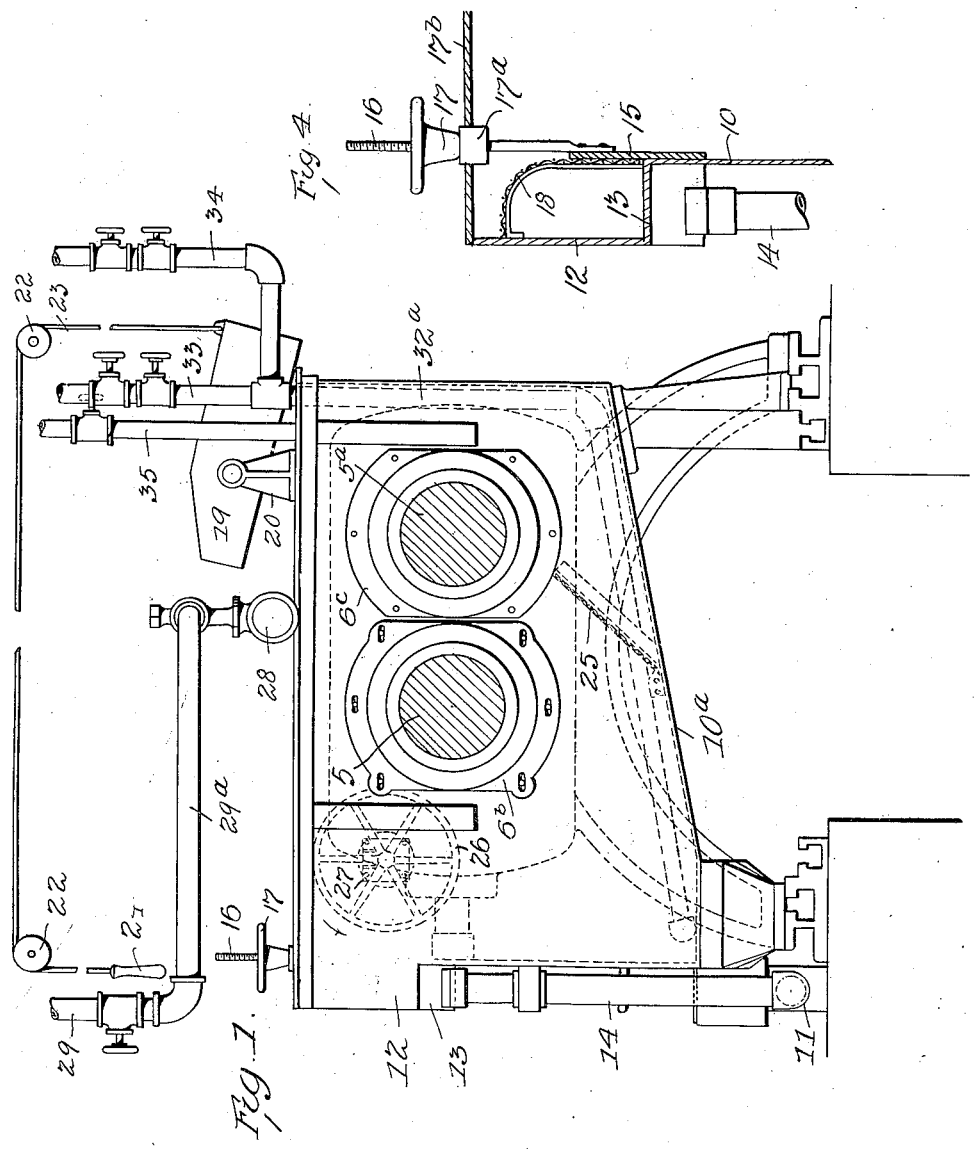

No. 821,717. PATENTED MAY 29, 1906.
F. C. HOOD.
PROCESS OF PURIFYING RUBBER.
APPLICATION FILED MAR. 24, 1905.

3 SHEETS—SHEET 2.

Attest:
C. S. Middleton
Edward N. Santon

Inventor.
Frederic C. Hood.
by Spear, Middleton, Donaldson & Spear
Attys.

No. 821,717. PATENTED MAY 29, 1906.
F. C. HOOD.
PROCESS OF PURIFYING RUBBER.
APPLICATION FILED MAR. 24, 1905.

3 SHEETS—SHEET 3.

Attest:
C. S. Middleton
Edward N. Saxton

Inventor.
Frederic C. Hood
By Spear Middleton Donaldson & Spear
Attys

UNITED STATES PATENT OFFICE.

FREDERIC C. HOOD, OF BROOKLINE, MASSACHUSETTS.

PROCESS OF PURIFYING RUBBER.

No. 821,717.　　　Specification of Letters Patent.　　　Patented May 29, 1906.

Application filed March 24, 1905. Serial No. 251,824.

*To all whom it may concern:*

Be it known that I, FREDERIC C. HOOD, a citizen of the United States, residing at Brookline, Massachusetts, have invented certain new and useful Improvements in Processes of Purifying Rubber, of which the following is a specification.

My invention relates to an improved method of purifying or washing rubber, and while designed more especially for washing or purifying crude and reclaimed rubber is applicable as well to gutta-percha and other similar materials.

The purifying or washing of the crude and reclaimed rubber, gutta-percha, and various other like materials, which forms one of the most important operations in rubber manufacturing, is at the present time universally carried out by passing the rubber through a machine known as a "rubber-washer," having two or more rotating rolls, which possess either smooth, corrugated, or diamond-cut surfaces. To facilitate the removal of the mechanical impurities, a jet or sheet of water is allowed to fall upon the rubber or other material as it passes between the nip of the rolls. While for the washing of high and medium fair rubbers this arrangement is on the whole considered fairly satisfactory, it has been found entirely inadequate to produce perfectly-washed sheets from all those rubbers containing sand, earthy matter, bark, wood, and other vegetable debris, chemical, and all other impurities. This is often due to the fact that the rubber passing through the rolls becomes more or less heated by their mechanical action, and the above-named impurities are caused to adhere to the rubber, and instead of being removed by the next passage of the rubber through these rolls they are ground into the rubber and can no longer be removed from it by this power. It is thus found that all grades of rubber containing material quantities of the above-named impurities at the end of the washing operation still contain a considerable portion of these impurities which has been ground into the rubber. Particularly in the case of vegetable impurities their presence in the rubber in a finely-comminuted state is liable to cause blowing in the subsequent vulcanization—in fact, to give rise to quite a number of manufacturing troubles.

I have found that by carrying out the purifying operation in such a manner that the rubber sheet is submerged in the washing liquid a great improvement in the purity of the washed sheet is effected, and this improvement is particularly marked in the case of those very impure grades of rubber which at the present time cannot be satisfactorily washed at all. By my improved process and apparatus I also effect a great saving in time and a material reduction in labor and consequent lessening of cost.

In carrying out my improved process or method the rolls are immersed in liquid, so that the level of the liquid in the tank rises above the height of the nip of the rolls, and then the rolls are rotated, so that the rubber as it passes between the nip of the rolls and at the time it is compressed thereby is flooded in the washing liquid, and the moment it issues from the other side of the rolls it finds itself also submerged, and any impurities which have come to the surface of the rubber sheet are thus at once floated off or deposited at the bottom of the tank, and the sheet itself rises automatically toward the surface of the liquid, where it passes over and is again caught by and carried through the rolls. This operation is continued until the sheet is found to be washed to the requisite state of purity. The dirt and impurities collecting at the bottom of the immersion-tank may be removed periodically or continually carried off by means of a pipe leading from the bottom of the tank, while the lighter impurities or those having less specific gravity are floated off at the surface of the liquid.

I use the term "liquid" because while water alone is generally used it may be desirable to add chemicals to the water or to substitute for the water other liquids having a specific solvent or chemical effect, and I have shown means for accomplishing this purpose in the drawings.

Some grades of rubber contain impurities which are best removed by the application of warm or hot water, which has a dissolving action thereon, and a further improvement in my process lies in first washing out those impurities which are insoluble by the action of cold water and thereafter raising the temperature of the liquid to wash out the soluble impurities either in the same tank-washer or in another tank-washer used in conjunction with it.

I have shown in the accompanying drawings a form of improved apparatus capable of carrying out my improved process.

Figure 2:
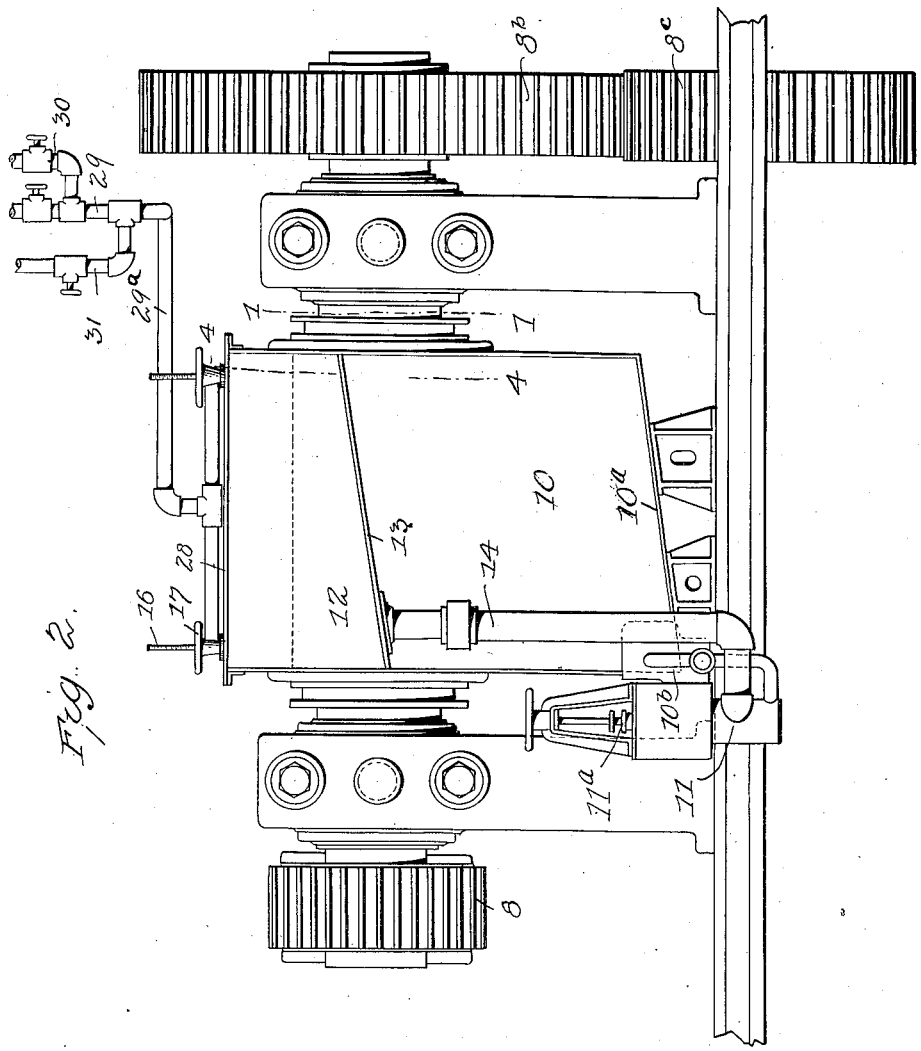
Figure 3:
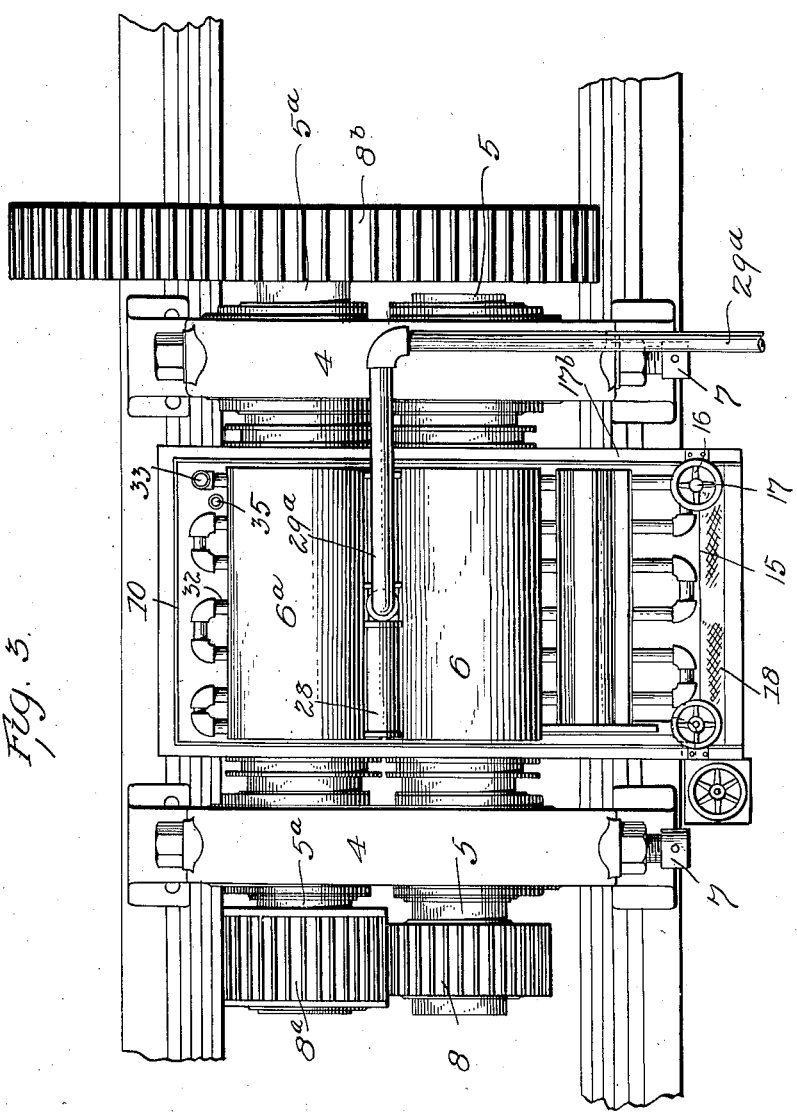

In the drawings, Figure 1 is a sectional elevation, the section being taken on line 1 1 of Fig. 2. Fig. 2 is a front view. Fig. 3 is a plan view with the hopper omitted, and Fig 4 is a sectional detail on line 4 4 of Fig. 1.

In the drawings I have shown at 4 4 a suitable frame in which are journaled the supporting-shafts 5 $5^a$ of the rollers 6 and $6^a$, which, as shown, are preferably located side by side. The bearings of one of the rollers 6 are made horizontally adjustable to a limited extent to permit the distance between the rolls to be varied, the adjustment being effected by the screw-bolts 7, having their heads adapted for the reception of a suitable operating-tool.

The shafts 5 and $5^a$ are provided at one side with intermeshing gears 8 and $8^a$, and one of them is provided at the opposite side of the machine with a large gear-wheel $8^b$, through which power is imparted to the machine by a gear $8^c$, driven from any suitable source. (Not shown.) The washing-rolls are surrounded by a tank 10, the bottom $10^a$ of which slopes both to the front and to one side, so that all matters washed out by the liquid and which are of greater specific gravity tend to settle toward one corner of the machine. This corner $10^b$ is connected to an outlet-pipe 11, which is provided with a gate-valve $11^a$, by which the outflow of liquid may be regulated or stopped, as desired.

At the upper front side is an extended portion 12, into which the surface liquid flows, carrying with it all impurities, this extended portion having an inclined bottom 13, which communicates at its lower end with a vertical pipe 14, communicating with the pipe 11 above referred to. A vertically-sliding gate or ledge 15 is provided, which may be raised and lowered by means such as the threaded rods 16 and hand-nuts 17, so that the height of the liquid in the tank may be varied. The rods pass through and the nuts 17 bear on the blocks $17^a$, secured to the flanges $17^b$ of the tank. A screen 18 of suitable mesh is also provided to prevent the possible loss of any fragments of rubber. Plates $6^b$ and $6^c$ are provided, which encircle the shafts of the rolls and are bolted to the side of the tank, so as to hold suitable packing in place and prevent leakage.

At 19 in Fig. 1 I have shown a tilting hopper pivotally supported upon suitable brackets 20, into which the crude rubber to be washed is thrown by the attendant, this hopper being omitted from Figs. 2 and 3 in order to show other parts.

Ordinarily the pan rests in the position shown in readiness to receive the crude rubber, and means are provided by which the attendant may tilt it from the front of the machine when the batch of washed rubber has been removed and a fresh lot of unwashed rubber is to be supplied. A convenient form of means for this purpose consists of a chain or like device 23, connected with the rear end of the hopper and passing over pulleys 22 to the front, where it is provided with a pull or handle 24.

When a fresh charge of rubber is dumped upon the rollers, it is carried through between them in a crinkled or irregular sheet. An inclined screen 25, usually assisted by the flow of water toward the outlets, deflects this toward the front of the tank, where, owing to its lightness, it at once rises to the surface of the liquid. In order to insure the front edge of this strip, film, or sheet being automatically returned over the nip of the rollers, so as to be again drawn down between the same, I provide a paddle-wheel 26, having its supporting-shaft removably journaled in bearing-boxes 27. If this paddle-wheel be rotated by any suitable means in the direction of the arrow, the sheet or film of rubber will be seized by the blades of the paddle-wheel and be carried back onto the top of the adjoining roller and thence down between the rolls without necessitating the handling of the rubber by the workman at this time.

The washing liquid is preferably supplied to the machine by a horizontal pipe 28, having delivery-openings in its under side. This pipe 28 is located, preferably, directly over the meeting line or nip of the rolls. A water-supply pipe 29 connects with this pipe 28 by a horizontal pipe $29^a$, while a steam-supply pipe 30 connects with the pipe 29, by which the temperature of the water may be varied as desired. A pipe 31 also connects with the pipe 29, by which chemicals may be mingled with the water when desired. Pipes 30 and 31 are shown only in Fig. 2 and omitted from 1 and 3 for convenience.

I may find it desirable to provide additional means for varying the temperature of the washing liquid, in which event I provide a pipe-coil 32 in the bottom of the tank with branch pipe connections 33 and 34 to the vertical portion $32^a$ for refrigerating fluid and steam, respectively, with suitable controlling-cocks, whereby the body of water in the tank may be directly acted upon. Branch pipes 33 and 34 are for convenience shown only in Fig. 1. A pipe 35 may be provided for extra water.

Having thus described my invention, what I claim is—

1. The herein-described process of purifying rubber and the like which consists in compressing or shredding it between coacting rolls and passing it through a body of purifying liquid whereby the liquid has access to all sides of the material permitting the heavier impurities to fall through the liquid and the lighter impurities to rise, substantially as described.

2. The herein-described process of purifying rubber and the like which consists in compressing or shredding it while suspended in a body of purifying liquid whereby the liquid has access to all sides of the material permitting the heavier impurities to fall through the liquid and the lighter impurities to rise, substantially as described.

3. The herein-described process of purifying rubber and the like, which consists in passing it between coacting rolls while submerged in the purifying liquid, and automatically returning the sheet issuing from between the rolls to the nip of the rolls for a fresh pass, substantially as described.

4. The herein-described process of purifying rubber and the like which consists in passing it between coacting rolls while submerged in a current of purifying liquid, and utilizing said current to return the rubber issuing from the rolls to the nip of the rolls for a fresh pass, substantially as described.

In testimony whereof I affix my signature in presence of two witnesses.

FREDERIC C. HOOD.

Witnesses:
CLINTON F. FISHER,
HERBERT C. MASON.